June 25, 1957      K. G. MACLEISH      2,797,050
REMOTE ADJUSTMENT OF AUTOMATIC CONTROL SYSTEM
Filed Nov. 6, 1945
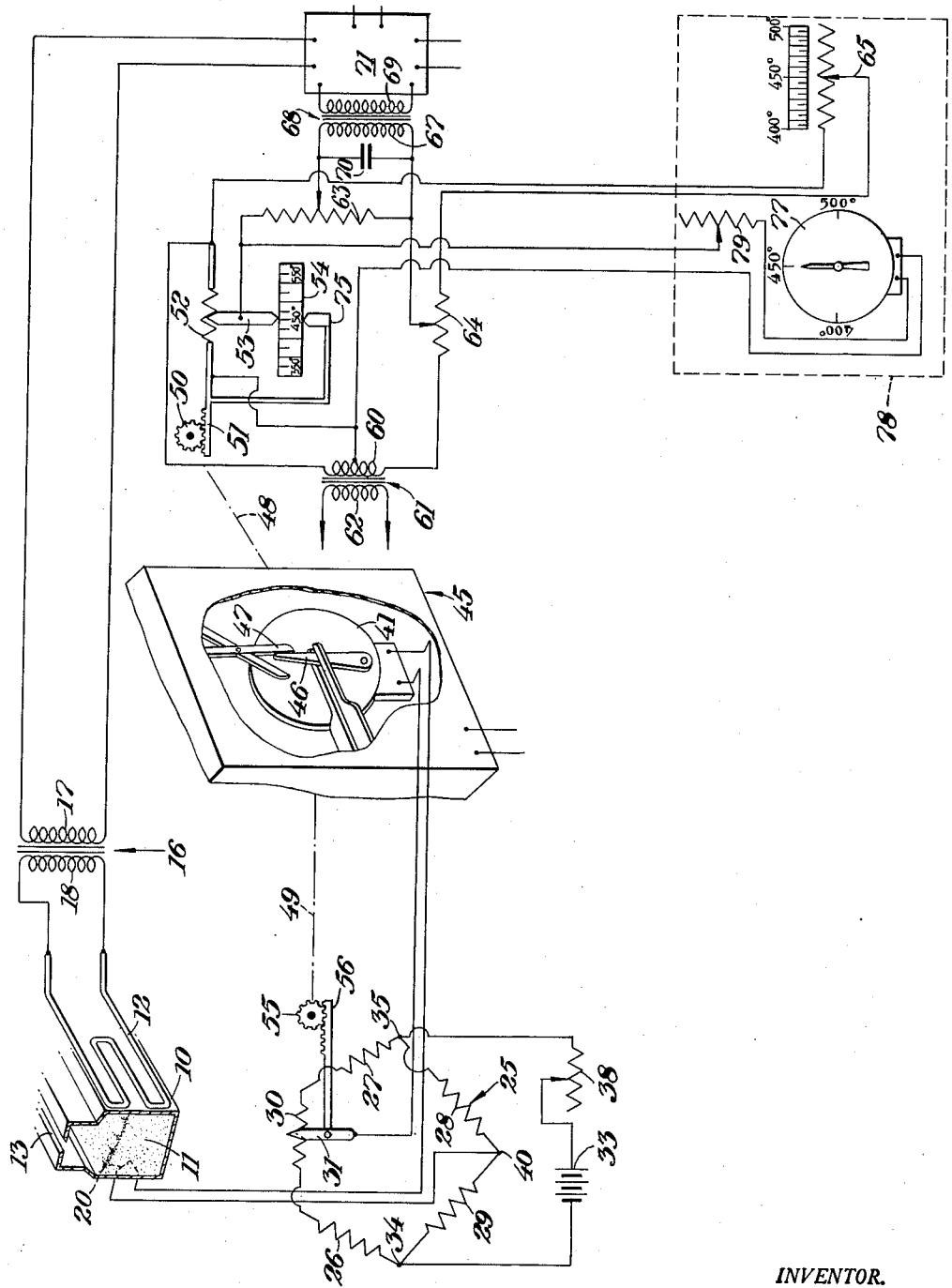
INVENTOR.
*Kenneth G. Macleish.*
BY United States Patent Office 2,797,050
Patented June 25, 1957

2,797,050

REMOTE ADJUSTMENT OF AUTOMATIC CONTROL SYSTEM

Kenneth G. Macleish, Oak Ridge, Tenn., assignor, by mesne assignments, to the United States of America as represented by the United States Atomic Energy Commission Application November 6, 1945, Serial No. 627,071

5 Claims. (Cl. 236—51)

This invention relates to automatic temperature control and is particularly concerned with improvements in arrangements for remote control or adjustment of particular systems and remote indication of the temperature.

My invention is concerned with a type of system wherein a potentiometer is adjusted in response to heating in the region wherein the temperature is being controlled. The potentiometer is a control potentiometer which controls the supply of heat to the region. In the particular control system in which my invention is an improvement the control potentiometer has a slide wire resistance and a slider cooperable therewith, the resistance and slider being relatively adjustable. The slider may be manually adjusted to control the temperature and the resistance is automatically adjusted (by being physically moved) in response to temperature variations for the purpose of controlling the temperature. The slider moves opposite a graduated temperature scale and it may be set opposite any desired temperature at which the system is to control. My invention provides a manually adjustable resistance located at a remote point, the resistance being arranged to vary the characteristics of the control potentiometer circuit for adjusting the temperature from the remote point, and my invention provides a voltmeter connected between one end of the slide wire resistance and the slider of the control potentiometer and calibrated in temperature degrees so as to indicate the temperature at the remote point. The voltmeter has a range corresponding to the voltage drop across the slide wire of the control potentiometer and its calibrations correspond to a section of the graduated temperature scale adjacent which the slider of the control potentiometer is movable. Thus the voltmeter deflects according to the relative positions of the slider and slide wire resistance and this deflection indicates a temperature at the voltmeter which is the temperature resulting from a movement of the slide wire resistance occasioned by adjusting the temperature maintained by the system from the remote point. The precise manner of operation of the invention will, of course, be more clearly understood from the detailed description following. It will be understood, however, that when the temperature maintained by the system is changed, that is adjusted from the remote point as described, the new temperature is indicated at the voltmeter located at the remote point.

The primary object of my invention is as set forth in the foregoing, that is to adjust the temperature control system from a remote point and to indicate the temperature at the remote point by means of a voltmeter connected between the slider and one end of the slide wire resistance forming the control potentiometer which is part of the system.

Further objects and numerous advantages of my invention will become apparent from the following detailed description and annexed drawing, the single figure of which is a diagrammatic representation of the temperature control system embodying my invention.

Referring to the drawing, numeral 10 shows in perspective a container or chamber in which a charge of solid material 11 may be vaporized by means of an electrical heating coil or resistance 12; chamber 10 has a longitudinal slit-like opening or exit 13 in the upper part thereof. Heater 12 is supplied with power from a transformer 16 having a primary winding 17 and a secondary winding 18.

My invention is primarily concerned with the control of the supply of electrical power to the heater 12. The control system provided is controlled in response to a thermocouple 20 associated with the container 10, the thermocouple 20 developing an E. M. F. which is dependent on the temperature in container 10. The thermocouple 20 is associated with a bridge circuit 25 having resistances 26, 27, 28 and 29 in its various legs and a potentiometer comprising a slide wire resistance 30 and a slider 31. A power supply comprising battery 33 is connected between opposite points 34 and 35 of the bridge circuit through variable resistance 38. The potentiometer comprised of slide wire resistance 30 and slider 31 is opposite point 40 of the bridge circuit and between this point and the potentiometer slider are connected the thermocouple 20 in series with a galvanometer 41. The galvanometer 41 is a part of an instrument 45 embodying a motor drive which provides for a mechanical response or responses whenever the galvanometer is unbalanced, the magnitude of the response or responses being proportional to the deflection of the galvanometer. The instrument 45 comprises a pair of jaws 46 which are mechanically actuated so as to periodically at short intervals clamp the galvanometer needle in whatever position the needle is in at the time. Numeral 47 designates a feeler mechanism somewhat on the order of a pair of scissors which is mechanically actuated to pinch the needle at periodic intervals in order to feel or sense the position of the needle. The feeler mechanism 47 controls a motor-driven apparatus which mechanically actuates shafts 48 and 49 in increments depending upon the amount that the galvanometer deflects. The mechanical movements of instrument 45 are of a type well known in the art, and since the instrument itself forms no part of my invention, it will not be described in further detail. The instrument 45 may be the type of instrument known in the art and commercially as the Micromax, manufactured by the Leeds & Northrup Company.

The shaft 48 actuates a pinion gear 50 associated with a rack 51 which operates to move a slide wire resistance 52 back and forth in accordance with the actuation of the shaft 48. Adjacent the slide wire resistance 52 is a manually adjustable slider 53 which has a lower part forming a pointer movable adjacent a graduated temperature scale 54.

The shaft 49 drives a pinion gear 55 associated with a rack 56 which is arranged to actuate the slider 31 relative to the slide wire resistance 30, the slider 31 being moved depending upon the magnitude and direction of deflection of the galvanometer 41.

The slide wire resistance 52 is directly connected across the upper half of the secondary 60 of a transformer 61 having a primary winding 62 connected to any suitable power source. The slider 53 is connected to the upper end of a potentiometer or voltage divider 63 and the lower end of this potentiometer is connected to the slider of another potentiometer 64. One end of the potentiometer 64 connects to the lower end of the secondary 60 of transformer 61. Numeral 65 designates another potentiometer or variable resistance which is connected across the secondary 60 of transformer 61 through the potentiometer 64. Potentiometer 65 is located at a remote control station 78. Adjacent potentiometer 65 is a temperature scale graduated from 400° to 500°. From the foregoing it will be seen that the potentiometer 63 is in series with the slider of potentiometer 64 and is in series with slider 53 associated with slide wire resistance 52. Thus, the voltage drop across the resistance of potentiometer 63 is dependent upon the adjustments of the potentiometers 53 and 64. The voltage at the upper end of the resistance of potentiometer 63 depends on the position of slider 53 relative to resistance 52. The potential at the lower end of the resistance of potentiometer 63 is dependent upon the setting of potentiometer 64 as well as the setting of potentiometer 65. Potentiometer 65 is in series with the resistance of potentiometer 64; it is in parallel with potentiometer 63. Thus by adjusting potentiometer 65, the voltage drop across the resistance of potentiometer 64 can be varied and this will vary the voltage at the lower end of potentiometer 63. The slider of potentiometer 63 connects to one terminal of the primary 67 of transformer 68 which has secondary 69, and the other terminal of the primary 67 is connected to the lower end of the resistance of potentiometer 63. Numeral 70 designates a condensor connected across the primary 67 of transformer 68. Thus, the voltage impressed across the primary 67 of transformer 68 depends on the setting of the slider of potentiometer 63 as well as upon the setting of the other potentiometers 53, 64 and 65. The purpose of potentiometer 63 is primarily to adjust the control differential of the system or as this is sometimes called, the "band width." That is, the position of the slider of potentiometer 63 determines how much effect a change in voltage drop across the resistance of potentiometer 63 will have on the signal impressed on the transformer 68. Thus when the slider of potentiometer 63 is near the lower end of the resistance, a change in voltage drop thereacross will change the signal a lesser amount than when the slider is higher up on the resistance. Thus potentiometer 63 is operable to adjust the temperature control differential, that is, the amount of temperature change which will vary the signal impressed on transformer 68 enough to change the heat supplied between minimum and maximum. The voltage output of the transformer 68 is impressed on a control device 71 which is any suitable type of electronic control device which produces an electrical output proportional to the voltage signal impressed thereon, and this control device may preferably be the device known as the Reactrol manufactured by the General Electric Company. The control device 71 controls the amount of power supplied to the primary 17 of transformer 16 and consequently the amount of power supplied to the electrical heater 12 associated with container 10.

The mechanism 71 will normally embody adjustments for setting the minimum and maximum amounts of heat that it can supply.

The slider 53 may be set adjacent the scale 54 opposite any desired temperature and this, of course, changes its position relative to the slide wire resistance 62. The rack 51 is mechanically connected, as shown, to another pointer 75 which moves adjacent scale 54 whenever the pinion 50 adjusts rack 51 and the slide wire resistance 52. The pointer 75 is an indicator of the temperature sensed by the thermocouple 20, and it is opposite the mid-point of slide-wire resistance 52.

Numeral 77 designates a voltmeter connected between slider 53 and the left end of slide wire resistance 52, the voltmeter having a calibrating rheostat 79 in series therewith. The resistance 52 has a predetermined voltage drop thereacross since it is connected directly across the upper half of the secondary 60 of transformer 61, as described, and the voltage drop is uniform normally since the control potentiometer is part of a bridge circuit which is normally in balance such that no current flows through the circuit including the slider 53. The voltmeter 77 has a range corresponding to the voltage drop across resistance 52 the mid-point of which is the position normally occupied by slider 53; the voltmeter 77 is calibrated in temperature degrees from 400° to 500°, mid-scale being 450° corresponding to the setting of slider 53. My invention contemplates controlling the system in the range from 400° to 500° from the remote control station 78, the slider 53 being left in the position shown on the drawing, that is opposite the 450° graduation on the scale 54. The calibration of the voltmeter 77 can be adjusted by the rheostat 79.

With reference to the operation of the system, assume that all of the parts are in the position shown on the drawing. The differential control potentiometer 63 is set as shown on the drawing and the slider 53 is opposite the 450° graduation on the scale 54 and the pointer 75 is matched therewith, the temperature in the container 10 being at 450° with the galvanometer 41 balanced. The potentiometer 64 is set for the appropriate range, with reference to the signal impressed on the transformer 68 and the corresponding amount of power that will be delivered by the transformer 16 under control of the control device 71, that is, the setting of potentiometer 64 is such that with the slider 53 in the position shown the voltage drop across potentiometer 63 will be such that enough heat will be supplied at container 10 to maintain 450° thus causing the pointer 75 to match with the slider 53. The system is stabilized and heat is being supplied at the required rate to maintain the temperature. In the event of a change of temperature in the container 10 the E. M. F. developed by thermocouple 20 will change and the bridge 25 will be unbalanced. This will cause the galvanometer 41 to deflect and then each time the jaws 46 clamp its pointer the feeler structure 47 will receive an impulse which will influence the motor mechanism of instrument 45 to actuate the shafts 48 and 49. Rotation of shaft 48 will actuate pinion 50, and rack 51 and accordingly slide wire resistance 52 (and pointer 75) will be moved to the right or left in a manner to change the voltage drop across the potentiometer 63 and to thus vary the signal impressed on the control device 71 which will change the amount of power supplied in a manner to cause the temperature to tend to go back toward the desired value. Actuation of shaft 49 will through pinion 55 actuate rack 56 which will move the slider 31 to right or left adjacent the slide wire 30 and in a direction to rebalance the bridge 25. The galvanometer 41 will be unbalanced whenever the temperature is changing and the magnitude of the deflection will depend upon the suddenness of the temperature change. The resistance 52 and the slider 31 will be mechanically adjusted whenever the galvanometer 41 deflects. The rebalancing action of slider 31 will normally rebalance galvanometer 41 within the space of a few seconds, that is, of course, if the temperature is no longer changing. The position of resistance 52 has, however, been changed resulting in a change in the amount of heat supplied to the container 10. Thus the temperature at container 10 as mentioned above will tend to return to the desired value and as soon as the thermocouple 20 begins to sense the return to normal it will unbalance the bridge 25 in the opposite direction from the original direction of unbalance. There may be considerable time lag between the time that the amount of heat supplied is changed and the time that it results in a temperature change at container 10. However, as just mentioned, when the temperature does start back to normal it will unbalance bridge 25 in the opposite direction. The mechanism will now operate in the reverse manner and the resistance 52 will be mechanically adjusted in a direction to remove the change which was initially made therein and similarly the slider 31 will again be operated in a manner to rebalance the bridge 25. As the thermocouple 20 continues to sense the change in temperature as it changes back to normal, it will continue to unbalance the bridge 25, that is in a direction opposite to the original unbalance and the device 41 will continue to operate in a manner to adjust resistance 52 to remove the original change which was made therein and to rebalance bridge 25. The unbalance of bridge 25 is usually extremely small as the temperature goes back to normal; however, this small unbalance is present all during the time the temperature is returning to normal and is enough to cause the resistance 52 to be moved back to its original position. When the temperature has been returned to its original normal value, the bridge 25 will rebalance as will the galvanometer 41 and the system will be restabilized at the original temperature setting with the pointer 75 again matched with slider 53.

It is desired to control the system from a remote point, that is a point remote from the position or station occupied by the slider 53 and the mechanism associated therewith. My invention provides for controlling the system over a range of 100°, for example, from the remote station which is designated as 78 on the drawing. In these circumstances the slider 53 is set opposite the temperature on scale 54 which is the midpoint of the range over which it is desired to control. This temperature is 450° in the present instance as indicated on the drawing, slider 53 being opposite 450° on scale 54 and midscale of voltmeter 77 being 450°. The scale opposite the rheostat or variable resistance 65 is graduated from 400° to 500° and the slider of this rheostat as shown on the drawing is opposite the 450° graduation. If it is desired to raise the temperature say to 475° the slider of potentiometer 65 is set opposite 475° on its scale. This varies the voltage drop across the resistance of potentiometer 64 which in turn varies the voltage drop across potentiometer 63 which adjusts the signal impressed on transformer 68 and accordingly the amount of power supplied by transformer 16. When potentiometer 65 is set up to 475° the heat supplied will be increased and accordingly bridge 25 will be unbalanced in response to thermocouple 20. Galvanometer 41 will deflect and resistance 52 and slider 31 will be adjusted as before. Resistance 52 will be adjusted gradually as the temperature increases until the pointer 75 is opposite 475° on scale 54, the bridge 25 finally rebalancing when the pointer 75 reaches the 475° graduation. This movement of resistance 52 will change its position relative to slider 53 and the reading of voltmeter 77 will increase to 475° thus indicating the temperature at the remote control station. By adjusting the rheostat 79, a voltmeter 77 can be calibrated so that its readings correspond to the relative positions of the resistance 52 and the slider 53; or in other words, so that its readings correspond to the reading of the pointer 75 since the pointer 75 moves with the resistance 52 in its movements relative to the slider 53.

From the foregoing those skilled in the art will observe that I have provided an effective method for remotely adjusting the temperature control system and for indicating the temperature at the remote point. Adjustment is made simply and the temperature is indicated in a manner requiring a minimum amount of equipment and additional wiring.

The embodiment of my invention disclosed herein is representative of its preferred form. The disclosure is to be interpreted in an illustrative rather than a limiting sense, the scope of the invention being determined in accordance with the claims appended hereto.

I claim:

1. In a control system for temperature or the like, in combination, a control system comprising a potentiometer having a slider and slide wire, the slide wire having a predetermined voltage drop thereacross, automatic mechanism including a condition responsive device for relatively adjusting the slider and slide wire for controlling the condition, the automatic mechanism being such that the slider normally has a substantially predetermined position relative to the slide wire except while change of the condition is being called for, remotely located manually actuatable means, associated with the automatic mechanism for causing the slider to move relatively to the slide wire, for changing the value of the condition, and a voltmeter connected between the slider and a part of the slide wire so as to indicate when the slider is out of its predetermined position.

2. A temperature regulating system comprising a temperature responsive electrical element, exposed to the temperature which is to be regulated, for producing an electrical signal dependent upon such temperature; a potentiometer having a relatively movable slide wire and slider; motive means responsive to said signal for displacing said slide wire from a normal positional relationship with respect to said slider in accordance with said signal; a heat producing system affecting the temperature to be controlled; said system including an input circuit and means for controlling the heat production rate of said system in response to a control voltage applied to said input circuit; means responsive to the relative position of said slide wire and slider for generating a voltage signal dependent upon such relative position; said last-named means including a source of electric power connected across the ends of said slide wire for producing a constant voltage drop thereacross; means including a remotely positioned manually adjustable member for modifying said voltage signal; means for applying the modified voltage signal to the input circuit of said heat producing system; and a voltmeter located at the remote position of said adjustable member and connected between said slider and one end of said slide wire.

3. A temperature regulating system comprising a temperature responsive electrical element, exposed to the temperature which is to be regulated, for producing an electrical signal dependent upon such temperature; a potentiometer having a relatively movable slide wire and slider; motive means responsive to said signal for displacing said slide wire from a normal positional relationship with respect to said slider in accordance with said signal; a heat producing system affecting the temperature to be controlled; said system including a pair of input terminals and means for controlling the heat production rate of said system in response to a control voltage applied across said terminals; a source of electric power connected across the ends of said slide wire for producing a constant voltage drop thereacross; means forming a connection between said slider and one of the input terminals of said heat producing system; means including a remotely positioned manually adjustable member for controlling the potential of the other terminal of said heat producing system; and a voltmeter located at the remote position of said adjustable member and connected between said slider and one end of said slide wire.

4. A temperature regulating system comprising a temperature responsive electrical element, exposed to the temperature which is to be regulated, for producing an electrical signal dependent upon such temperature; a potentiometer having a relatively movable slide wire and slider; motive means responsive to said signal for displacing said slide wire from a normal positional relationship with respect to said slider in accordance with said signal; a heat producing system affecting the temperature to be controlled; said system including a pair of input terminals and means for controlling the heat production rate of said system in response to a control voltage applied across said terminals; a voltage source having an intermediate tap; means forming a connection between one end of said source and one end of said slide wire; means forming a connection between said intermediate tap and the other end of said slide wire, whereby a constant voltage drop is produced across said slide wire; a circuit including a resistor connected across said source; means forming a connection between said slider and one input terminal of said heat producing system; means forming a connection between a point on said resistor and the other input terminal of said heat producing system; means including a remotely positioned manually adjustable member for varying the current flow through said resistor; and a voltmeter located at the remote position of said adjustable member and connected between said slider and one end of said slide wire.

5. A temperature regulating system comprising a temperature responsive electrical element, exposed to the temperature which is to be regulated, for producing an electrical signal dependent upon such temperature; a potentiometer having a relatively movable slide wire and slider; motive means responsive to said signal for displacing said slide wire from a normal positional relationship with respect to said slider in accordance with said signal; a heat producing system affecting the temperature to be controlled; said system including a pair of input terminals and means for controlling the heat production rate of said system in response to a control voltage applied across said terminals; a voltage source having an intermediate tap; means forming a connection between one end of said source and one end of said slide wire; means forming a connection between said intermediate tap and the other end of said slide wire, whereby a constant voltage drop is produced across said slide wire; a resistive series circuit connected across said voltage source; said circuit including a resistor and a remotely positioned manually adjustable rheostat; means forming a connection between said slider and one input terminal of said heat producing system; means forming a connection between a point on said resistor and the other input terminal of said heat producing system; and a voltmeter located at the remote position of said rheostat and connected between said slider and one end of said slide wire.

References Cited in the file of this patent
UNITED STATES PATENTS

| | | |
|---|---|---|
| 502,399 | Haskins | Aug. 1, 1893 |
| 1,533,680 | Wiederhold | Apr. 14, 1925 |
| 1,699,759 | Shepherd | Jan. 22, 1929 |
| 1,916,737 | Midworth | July 4, 1933 |